(12) United States Patent
Rabinovitch

(10) Patent No.: US 7,483,998 B2
(45) Date of Patent: Jan. 27, 2009

(54) SOFTWARE CONFIGURABLE CLUSTER-BASED ROUTER USING HETEROGENEOUS NODES AS CLUSTER NODES

(75) Inventor: Peter Rabinovitch, Kanata (CA)

(73) Assignee: Alcatel Lucent, Paris (FR)

( * ) Notice: Subject to any disclaimer, the term of this patent is extended or adjusted under 35 U.S.C. 154(b) by 866 days.

(21) Appl. No.: 10/712,104

(22) Filed: Nov. 14, 2003

(65) Prior Publication Data

US 2005/0108425 A1  May 19, 2005

(51) Int. Cl.
- *G06F 15/173* (2006.01)
- *G06F 15/16* (2006.01)
- *G06F 11/00* (2006.01)
- *H04J 1/16* (2006.01)
- *H04J 3/14* (2006.01)
- *H04L 12/26* (2006.01)
- *H04L 12/28* (2006.01)
- *H04L 12/56* (2006.01)
- *G06F 15/177* (2006.01)
- *G06F 9/00* (2006.01)
- *G06F 9/24* (2006.01)
- *G06F 1/24* (2006.01)
- *G01R 31/08* (2006.01)
- *G08C 15/00* (2006.01)
- *H04L 1/00* (2006.01)

(52) U.S. Cl. .................. 709/238; 709/232; 709/233; 709/241; 714/4; 370/218; 370/230; 370/238; 370/244; 370/389

(58) Field of Classification Search ............... 709/221, 709/232–235, 238–241, 246, 252, 253; 370/216–220, 370/229, 230, 230.1, 237, 238, 240, 244, 370/257, 389; 713/1, 2, 100; 714/4

See application file for complete search history.

(56) References Cited

U.S. PATENT DOCUMENTS

| | | | | |
|---|---|---|---|---|
| 6,954,784 | B2* | 10/2005 | Aiken et al. ................ | 709/220 |
| 6,965,936 | B1* | 11/2005 | Wipfel et al. ............... | 709/224 |
| 6,986,076 | B1* | 1/2006 | Smith et al. .................. | 714/4 |
| 6,996,631 | B1* | 2/2006 | Aiken et al. ................ | 709/242 |
| 7,003,574 | B1* | 2/2006 | Bahl ........................ | 709/228 |
| 7,028,183 | B2* | 4/2006 | Simon et al. ................ | 713/168 |
| 7,039,784 | B1* | 5/2006 | Chen et al. .................. | 711/170 |
| 7,043,562 | B2* | 5/2006 | Dally et al. ................ | 709/238 |

(Continued)

OTHER PUBLICATIONS

Baker, F. "Requirements for IP Version 4 Routers," RFC 1812, Jun. 1995, pp. 1-175.*

(Continued)

*Primary Examiner*—Jason D Cardone
*Assistant Examiner*—Melvin H Pollack

(57) ABSTRACT

A cluster router architecture and methods for performing distributed routing are presented. The cluster router architecture includes off-the shelf Personal Computer (PC) hardware-based router cluster nodes interconnected in an intra-connection network in multiple dimensions. Each PC-based router cluster node is provided with the same routing functionality and a router-cluster-node-centric configuration enabling each router cluster node to provide routing responses for packets pending processing. Packet processing is divided into entry packet processing and routing response processing; special processing; and exit processing. Exit packet processing is performed by router cluster nodes transmitting packets into communication networks in which the cluster router participates. Packet processing is interrupted on determining that special processing is required in respect of a packet, and the packet is handed over to a corresponding special purpose router cluster node.

34 Claims, 8 Drawing Sheets

U.S. PATENT DOCUMENTS

| | | | | |
|---|---|---|---|---|
| 7,058,846 B1* | 6/2006 | Kelkar et al. | .................... | 714/4 |
| 7,069,317 B1* | 6/2006 | Colrain et al. | .............. | 709/224 |
| 7,103,664 B1* | 9/2006 | Novaes et al. | ............... | 709/226 |
| 7,117,242 B2* | 10/2006 | Cherkasova et al. | ......... | 709/203 |
| 7,120,681 B2* | 10/2006 | Frelechoux et al. | ......... | 709/221 |
| 7,130,266 B2* | 10/2006 | Virtanen et al. | ............. | 370/230 |
| 7,139,819 B1* | 11/2006 | Luo et al. | .................... | 709/223 |
| 7,139,925 B2* | 11/2006 | Dinker et al. | .................. | 714/4 |
| 7,146,421 B2* | 12/2006 | Syvanne | ..................... | 709/226 |
| 7,146,432 B2* | 12/2006 | Antes et al. | ................. | 709/239 |
| 7,165,120 B1* | 1/2007 | Giles et al. | .................. | 709/249 |
| 7,170,895 B2* | 1/2007 | Wirth et al. | ................. | 370/400 |
| 7,231,461 B2* | 6/2007 | Laschkewitsch et al. | .... | 709/248 |
| 7,239,605 B2* | 7/2007 | Dinker et al. | ............... | 370/216 |
| 7,353,259 B1* | 4/2008 | Bakke et al. | ................ | 709/208 |
| 7,353,276 B2* | 4/2008 | Bain et al. | .................. | 709/225 |
| 7,421,478 B1* | 9/2008 | Muchow | ..................... | 709/209 |
| 2001/0052024 A1* | 12/2001 | Devarakonda et al. | ...... | 709/238 |
| 2003/0018927 A1* | 1/2003 | Gadir et al. | .................... | 714/4 |
| 2003/0154306 A1* | 8/2003 | Perry | ......................... | 709/245 |
| 2003/0237016 A1* | 12/2003 | Johnson et al. | ................ | 714/4 |
| 2005/0018665 A1* | 1/2005 | Jordan et al. | ................ | 370/388 |
| 2005/0091396 A1* | 4/2005 | Nilakantan et al. | .......... | 709/232 |
| 2005/0097206 A1* | 5/2005 | Rabinovitch et al. | ........ | 709/224 |

OTHER PUBLICATIONS

Varadhan, K. "BGP OSPF Interaction," RFC 1364, Sep. 1992, pp. 1-14.*

Li, T. et al. "Cisco Hot Standby Router Protocol (HSRP)," RFC 2281, Mar. 1998, pp. 1-17.*

Knight, S. et al. "Virtual Router Redundancy Protocol," RFC 2338, Apr. 1998, pp. 1-27.*

Welling, Girish et al. "CLARA: A CLuster-based Active Router Architecture," IEEE MICRO, 2001, pp. 1-8.*

Guo, Jiani et al. "A Cluster-Based Active Router Architecture SUpporting Video/Audio Stream Transcoding Service," Proceedings of the International Parallel and Distributed Processing Symposium, Apr. 26, 2003, pp. 1-8.*

Chiueh, Tzi-cker and Pradhan, Prashant. "High Performance IP Routing Table Lookup Using CPU Caching," IEEE INFOCOM, 1999, pp. 1-8.*

Chiueh, Tzi-cker and Pradhan, Prashant. "Suez: A Cluster-Based Scalable Real-Time Packet Router," Proceedings of the 20th International Conference on Distributed Computing Systems, Apr. 13, 2000, pp. 136-144.*

Aversa, L. and Bestavros, A. "Load Balancing a Cluster of Web Servers: Using Distributed Packet Rewriting," IEEE International Performance, Computing and Communications Conference (IPCCC), Feb. 22, 2000, pp. 24-29.*

Wolf, T. and Turner, J.S. "Design Issues for High-Performance Active Routers," IEEE Journal on Selected Areas in Communications, vol. 19, Issue 3, Mar. 2001, pp. 404-409.*

Pappu, Prashanth et al. "Distributed Queueing in Scalable High Performance Routers," 22nd Annual Joint Conference of the IEEE Computer and Communications Societies (INFOCOM), vol. 3, Apr. 3, 2003, pp. 1633-1642.*

Vuppala, Vibhavasu and Ni, Lionel M. "Design of a Scalable IP Router," IEEE Hot Interconnects, Jul. 22, 1997, pp. 1-7.*

Keshav, S. and Sharma, R. "Issues and Trends in Router Design," IEEE Communications Magazine, vol. 36, Issue 5, May 1998, pp. 144-151.*

Kohler et al, "The Click Modular Router", Laboratory for Computer Science, Massachusetts Institute of Technology, Date: 2000, pp. 1-34.

Kohler, "The Click Modular Router", Submitted to the Department of Electrical Engineering and Computer Science in partial fulfillment of the requirements for the degree of Doctor of Philosophy at the Massachusetts Institute of Technology, Feb. 2001 (pp. 1-127).

Cecchet, SciFS Technical & Practical Guide, Release 26, INRIA Rhone-Alpes SIRAC Laboratory (pp. 1-73), http://sci-serv.inrialpes.fr.

Cecchet, "What ls SciFS?", SciFS: A Distributed Shared Virtual Memory for SCI Cluster, http://sci-serv.inrialpes.fr/SciOS/whatis_scios.html (2 sheets).

Gilbert et al, "Scalable Routing Through Clusters", Department of Computer Science, Duke University, Durham, N.C., Published on the Internet at http://www.cs.duke.edu/~marty/cbr/ (5 sheets), Dec. 15, 1999.

Appenzeller et al, "Can Google Route?", OFeb. 2002 (21 sheets).

Chen et al, "Flexible Control of Parallelism in a Multiprocessor PC Router", published in the Proceedings of the USENIX 2001 Annual Technical Conference, Jun. 2001 (pp. 1-14).

* cited by examiner

SOFTWARE CONFIGURABLE CLUSTER-BASED ROUTER USING HETEROGENEOUS NODES AS CLUSTER NODES

FIELD OF THE INVENTION

The invention relates to routing packets in packet-switched communication networks, and in particular to methods and apparatus for distributed routing response determination.

BACKGROUND OF THE INVENTION

In the field of packet-switched communications, transported content is conveyed between source and destination communications network nodes in accordance with a store-and-forward discipline. The content to be transported is segmented, and each content segment is encapsulated in a packet by adding headers and trailers. Each packet is transmitted by the source network node into an associated communications network over communication links interconnecting communications network nodes. At each node, a packet is received, stored (buffered) while awaiting a packet processing response, and later forwarded over a subsequent interconnecting link towards the intended destination network node in accordance with: a destination node specification held in the packet header, and forwarding specifications provided via the packet processing response.

Packet processing responses include, but are not limited to: switching, routing, traffic classification, traffic/content filtering, traffic shaping, content/traffic encapsulation, content encryption/decryption, etc. packet processing responses. A switching response in the context of a network node processing a particular received packet, specifies that the packet is to be forwarded via a particular output port of the subject network node. A routing response relates to a switching response determined based on a group of routing criteria. The routing criteria may include, but are not limited to: communication link states, service level specifications, traffic classification, source/destination network node specification, time-of-day, congestion conditions, etc.

One of the benefits of the store-and-forward discipline employed in conveying packets in packet-switched communication networks, stems from an ability of packet-switched networks to route packets around failed/congested communications network infrastructure, diminishing an otherwise need for a redundant communication network infrastructure, to reliably transport packets between source and destination network nodes.

One of the drawbacks of the store-and-forward discipline employed in conveying packets in packet-switched communication networks, stems from delays incurred in obtaining packet processing responses—probably the most notable being the routing response delay which is for the most part non-deterministic. Additional non-deterministic delays are incurred if packets are subject to special treatment in providing packet processing responses such as, but not limited to: billing, encryption/decryption, video processing, authentication, directory services, network management functions, etc.

Single unit, dedicated, hardware implemented router communication network nodes have been developed and deployed with various levels of success. Single unit, packet-switching communications network nodes implementing virtual routers have also been developed and deployed with various levels of success. However content transport capacity over interconnecting links, known as transport bandwidth, continues to increase at exponential rates, as well component miniaturization has enabled the aggregation of large amounts of packet traffic into such dedicated single unit router nodes. A lot of research and development has been, and is being, undertaken in respect of packet router network node design, which has lead to special purpose solutions typically addressing specific packet processing issues and/or to support specific services via dedicated (router units) equipment. Router development costs are incurred in designing and validating the routing functionality, as well in designing and validating the special purpose, dedicated, router node hardware. Typically, the more functionality is desired to be provided by a particular router hardware implementation, the more prohibitive the development and validation costs are.

Deploying single unit, dedicated, hardware implemented routers has always exposed a service provider operating thereof to technology change risks typically associated with new services. To some extent the single unit, dedicated, hardware implemented routers may be upgraded with new software and installed interface cards may be replaced with new more advanced interface cards supporting the new services. However, such attempts are typically limited as the original design thereof took advantages of all and any resources provided by the core hardware implementation. Therefore, the performance thereof in respect of new services is less than satisfactory.

The single unit, dedicated, hardware implemented routers have evolved from computer-host-type network nodes. The relatively large expense associated with the development and deployment of single unit, special purpose, dedicated, hardware implemented routers has caused researchers to reconsider computer-host-type router implementations as personal computer equipment costs have decreased relative to the computing capability provided. The intent is to leverage readily available personal-computer hardware, which has also undergone separate intense development and standardization, to provide routing functionality comparable to hardware implemented router nodes. Returning to computer-host-type router solutions is in some ways considered a step back, because computer-host router implementations are software-based router implementations lacking packet processing response time guarantees, whereas dedicated router (equipment) nodes tend to implement the routing functionality in hardware which provides bound packet processing response times.

FIG. 1 is a generic functional block diagram showing a legacy Personal Computer (PC) software-based router implementation. The legacy PC router implementation 100, which executes on an operating system platform 102 such as, but not limited to, Linux, includes software-implemented routing functionality, such as, but not limited to: packet filtering 110, packet header modification 112, packet queuing 114, scheduling 116, etc. The routing behavior of the legacy PC router 100 can be re-configured by re-coding the desired router functionality (110-116). Typically legacy PC router implementations 100 execute optimized special-purpose code to effect routing. While special-purpose code provides some efficiencies in providing routing responses, such solutions are not necessarily optimal under all conditions and typically lead to proprietary implementations addressing particular service deployments. Over-optimization leads to inflexible and expensive to maintain solutions.

Improvements towards an improved PC-based router implementation includes the configurable Click router framework project at the Massachusetts Institute of Technology, U.S.A., a description of which can be found at http://www.pdocs.lcs.mit.edu/click/. Various developers have contributed to the development of the Click router framework including: Eddie Kohler (Ph.D. thesis student), Professor M. Frans Kaashoek and Professor Robert Morris, Benjie Chen, and John Jannotti.

The Click router framework development started as an investigation into possible routing response processing improvements achievable by codifying discrete router functional blocks which, via a high level router description language, could be combined to implement (PC-based) router functionality at reduced router code maintenance overheads. FIG. 2 shows an exemplary prior art Click router configuration 200 implementing an experimental Internet Protocol (IP) router, the configuration 200 specifying discrete router functional blocks and packet processing flows defined between the discrete router functional blocks.

Various levels of success were attained, including the realization that, in order to achieve superior packet throughput through a single off the shelf PC-based router, running a typical operating system, a closer coupling between the operating system, router software (Click in the MIT investigation), and the Network Interface Cards (NIC) (physical ports) was necessary. The typical interrupt handling technique ubiquitously used by network interface cards to report receiving a packet, and to announce availability to transmit a packet, was replaced by a polling technique to eliminate "receive livelock" conditions. It was found that using poling techniques, minimum-sized packet throughput increased fourfold. Minimum-sized packets are the most demanding of all types of packets when it comes to providing a processing response, as PC central processor resources are consumed in proportion to the number of packets processed not in proportion to the content bandwidth conveyed. The content bandwidth conveyed is ultimately limited by the bandwidth of the PC bus. Statistically however, the median packet size is relatively small in a typical use environment.

Other results of the MIT Click investigation, include the definition of only sixteen generic discrete functional router blocks as a framework for implementing comprehensive packet processing responses—other specific functional router blocks being derived from the sixteen generic functional router blocks. In providing packet processing responses, the prior art typically concentrates on queuing disciplines and queue service disciplines. In the prior art, each routing function (filter 110, process 112, queue 114, schedule 116) contended for CPU time and cache. The Click investigation, however, looked into potential improvements achievable by prioritizing packet processing flows within a single PC-based router, and found that improvements may be benefited from careful allocation of CPU processing resources to packet processing flows which reduced CPU cache misses.

Further results of the MIT Click investigation, include the adaptation of the Click router framework software code to operate on a multi-processor-single-PC-based platform. The investigation continued toward prioritizing packet processing flows seeking benefits from careful allocation of the processing resources of all CPUs of the multiple-processor-PC platform to packet processing flows. CPU allocation to port-related packet processing flows seemed to provide best results by leveraging parallel processing over the multitude of processors (a maximum of 4 CPUs per PC-based router were employed in the investigation). However, it was found that one of the most detrimental of overheads were cache misses whose minimization correlated with increased packet processing throughput.

However, the sharing of a single data bus between the multiple processors of the single-PC router implementation represented a limitation as, during periods of high packet throughput, the multiple CPUs contend for the single data bus. Therefore, implementing large capacity routers in accordance with the MIT Click investigation is difficult and/or very expensive to achieve because a very fast PC computing platform is required. This is due to the fact that the Click routing framework design is based on employing a single PC platform, and hence its performance is ultimately limited by the speed of the PC platform.

In the field of distributed computing there is a current push to achieve network computing. Recent developments include the Scalable Coherent Interface (SCI) initiative which focuses on using new high bandwidth and low latency memory-mapped networks to build high performance cluster computing servers. The work in progress includes SCIOS, published on the Internet at http://sci-serv.inrialpes.fr/SciOS/whatis_scios.html, (contributor: Mr. Emmanuel Cecchet, France), which is an operating system module for the Linux operating system kernel offering services for managing resources in a cluster of Linux network nodes interconnected in an SCI network. The work in progress also includes SCIFS, published on the Internet at http://sci-serv.inrialpes.fr/SciFS/whatis_scifs.html, which is a file system module for the Linux kernel offering services for implementing a distributed shared virtual memory, built on top of SCIOS, using a memory mapped file concept.

The success of distributed computing towards achieving network computing, including the SCIOS/SCIFS initiative, hinges on the type of computation necessary to solve a problem. Network computing provides computation efficiencies, if the necessary work to solve the problem can be divided into discrete and independent work units, such that the processing of each work unit has a minimal to no influence on the processing of other work units. A successful network computing implementation is the SETI@Home project where processing each work unit involves determining self correlation between recorded signals in a single work unit.

Investigations into distributed routing must take into account the issues pointed out by the Click initiative, that of packet processing flows traversing multiple routing functional blocks. The single PC-platform-based Click router framework investigation does not address network computing implementation issues and it is difficult to envision how, on their own, the results of the Click router framework investigation could be employed directly to provide distributed routing.

A prior art attempt towards distributed routing was made by Martin Gilbert, Richard Kisley, Prachi Thakar of Duke University, U.S.A., published on the Internet at http://www.cs.duke.edu/~marty/cbr/, entitled "Scalable Routing Through Clusters". Gilbert et al. employed an experimental setup having two interconnected but otherwise independent PC-based routers.

Further, Gilbert et al. found that, packets which cannot be received and sent from the same entry router node in the cluster router, must be forwarded from the entry router node over an intra-connection network to the exit router node, from where the packets are forwarded into an associated external communications network.

Gilbert et al. realized that, for a cluster of PC-based routers to operate as a "single" router, it is was necessary for the Time-To-Live (TTL) packet header value to be decremented only once by exit nodes in the cluster. Gilbert et al. used a packet tagging technique and packet TTL decrement suppression code to prevent premature packet TTL decrements. The proposed solution actually introduced a problem: low TTL value packets are processed through the router cluster (in the Gilbert et al. implementation by both PC-based clusters) only to be dropped by exit cluster node, the corresponding Internet Control Message Protocol (ICMP) messages being sent from the exit router node and routed back through the entry router cluster (2 PC routers) towards the source. The proposed solution was extended to identify packets bearing low packet TTL values for immediate processing, at entry nodes in the cluster, rather than processing these packets through the cluster.

To implement the intra-connection network, Gilbert et al. found it necessary to employ an additional lightweight protocol and a hierarchical naming scheme for router nodes in the cluster. The proposed solution was not without problems, of which Gilbert et al. identified: a routing overhead consisting of additional routing messages which needed to be exchanged in the cluster to propagate routing information related to external and internal changes to the cluster; extra protocol stack handling due to packets traversing several router nodes which involved examining each packet being processed at the IP layer to determine correct forwarding; and bandwidth reservation in the intra-connection network had to take into account the internal overhead. Although recognized as not ideal, Gilbert et al. propose employing statically-coded routing at each router node in the cluster to address the route-information sharing problem. Gilbert et al. state that "the ideal solution would be that the intra-connection network is completely transparent", and provide only a characterization stressing that: "[as the number of router nodes in the cluster increases], the latency associated with the extra protocol translation and physical link traversal on the intra-connection network will limit end-to-end throughput." Gilbert et al. call for employing, perhaps future faster packet transport technologies to alleviate these issues in order to achieve the stated goals of their presented solution.

Yet another prior art investigation into distributed routing is presented in FIG. 3 which shows an architecture referred to as a cluster-based router (CbR). The 4×4 cluster-based router 300 shown is comprised of four 2×2 router modules 310. Each of the routing modules 310 is implemented on a PC computing platform having gigabit Ethernet (1 GE), or similar, high speed interfaces 320. The 2×2 router modules 310 are interconnected in a manner that forms a non-blocking 4×4 routing architecture. Different sizes and arrangements of router modules 310 are possible to form different sized router clusters 300. Furthermore, a hierarchy of cluster-based routers 300 can be used to form even larger cluster-based routers. For example, a 16×16 CbR could be created from four of the 4×4 cluster-based routers 300 shown in FIG. 3. General details of this prior art proposal used to be found on the Internet at http://www.stanford.edu/class/ee384y/, but the details are no longer published.

The CbR router 300 lacks flexibility in configuring thereof to address specific routing issues, and changes in routing functionality require new hardware or new code development. Moreover, it is apparent that a scalability issue exists as the number of 2×2 router modules 310 increases as $O(N^2)$ for an $O(N)$ growth in ports.

Another prior art investigation into the feasibility of using a Clos network to implement distributed routing is entitled "Can Google Route?" and was presented by Guido Appenzeller and Mathew Holliman. The Clos network architecture is proposed because such a design is non-blocking.

Appenzeller and Holliman show a dramatic increase in cost-per-gigabit with total throughput for single unit dedicated routers. Appenzeller and Holliman show that using Clos-network-type router clusters is only more economical than single unit dedicated hardware routers for implementations involving very large numbers of ports. In general Clos networks employ a hierarchy of nodes: edge and core. Edge nodes exchange packets with external communications networks while core nodes do not, which is why, in general, switching N inputs to N outputs requires $(N/4)\log_4 N(1.5)^{\wedge} \log_2 \log_4 N$ which increases $O((N/4)\log_4 N)$ with N.

Further Appenzeller and Holliman confirm the results of the MIT Click investigation, in that the use of PC bus interrupt techniques represents a packet throughput bottleneck and propose aggregating short packets. To implement the proposal, the network interface cards employed must have large buffers operating at line speed which negatively impacts the cost of such a deployment. While the MIT Click investigation proposes to use optimized network interface card polling techniques, Appenzeller and Holliman propose a less optimum solution of using Linux in halted mode.

In view of the aforementioned shortcomings of the prior art investigations, what is desired is a low-cost router that is flexible, and scalable in routing capacity and port count.

SUMMARY OF THE INVENTION

In accordance with an aspect of the invention, a cluster-based router is provided. The cluster router includes a plurality of interconnected router cluster nodes, the routing capacity of the cluster router increasing substantially $O(N)$ with the number N of router cluster nodes in the cluster router. Each router cluster node has a group of cluster router external links enabling packet exchange with a plurality of external communication network nodes. At least one special purpose cluster node provides special packet processing functionality in the cluster router. A plurality of cluster router internal links interconnect router cluster nodes forming an intra-connection network ensuring a high path diversity in providing resiliency to failures. And, each router cluster node operates in accordance with a provisioned router-cluster-node-centric configuration to effect distributed routing of the conveyed packets. Employing the at least one special purpose cluster node provides a reduction in the development, validation, deployment, and re-configuration of the cluster router.

In accordance with another aspect of the invention, the at least one special purpose cluster node providing special packet processing functionality further comprises one of: a specially coded personal computer platform, a personal computer platform having designed hardware characteristics in providing specific functionality, dedicated hardware implemented equipment designed to provide an enhancement in providing special packet processing functionality, and a router cluster node further coded to provide special packet processing functionality.

In accordance with a further aspect of the invention, the intra-connection network further comprises an n dimensional toroidal topology. 2*n internal links interconnect each router cluster node with 2*n adjacent neighboring router cluster nodes; the routing capacity of the cluster router being increased substantially linearly by adding an n−1 dimensional slice of router cluster nodes to the cluster router.

In accordance with a further aspect of the invention, the cluster router further includes: at least one management node; and a plurality of management links interconnecting the at least one management node with the plurality of router cluster nodes. The plurality of management links enable one of out-of-band: configuration deployment to each router cluster node, router cluster node initialization, and reporting functionality. Employing the plurality of management links, reduces an in-band cluster router management overhead.

In accordance with a further aspect of the invention, the special purpose cluster node is associated with the management node; the special functionality provided being available one-hop-away from each router cluster node.

In accordance with a further aspect of the invention, the plurality of management links from a one of a star and bus topology.

In accordance with a further aspect of the invention, the cluster router further includes an internal addressing process dynamically determining router cluster node addressing.

In accordance with a further aspect of the invention, the cluster router further includes an external addressing process dynamically determining a router cluster address.

In accordance with a further aspect of the invention, means are provided for distributing to each router cluster node information regarding availability and addressing information regarding special purpose cluster nodes.

In accordance with a further aspect of the invention, methods of detecting special purpose cluster nodes providing special packet processing functionality are provided.

In accordance with a further aspect of the invention, a router cluster node of a plurality of router cluster nodes interconnected in a cluster router is provided. The router cluster node includes a plurality of cluster router internal interconnecting links connected thereto, the internal interconnecting links enabling the exchange of packets with adjacent cluster nodes in the cluster router. At least one cluster router external link connected thereto, the at least one external link enabling exchange of packets between external communications network nodes and the cluster router. And, a router-cluster-node-centric configuration to effect distributed routing of the conveyed packets. The equivalency between router cluster nodes in the cluster router providing a scalable router.

In accordance with a further aspect of the invention, the router cluster node further provides special packet processing functionality as a special purpose cluster node.

In accordance with a further aspect of the invention, a router-cluster-node-centric configuration is provided. The router-cluster-node-centric configuration enables the provision of a distributed packet routing response in a cluster router having a plurality of router cluster nodes. The configuration specifies a plurality of routing functional blocks; and at least one router-cluster-node-centric packet processing flow, via the plurality of routing functional blocks. The routing of packets received at the cluster router is effected employing one of a single router cluster node and a group of router cluster nodes.

In accordance with a further aspect of the invention, the router-cluster-node-centric configuration includes: an entry-and-routing processing packet processing flow specification; a transit packet processing flow specification; and an exit packet processing packet processing flow specification. The packet processing flow specifications enable a received packet to undergo entry-and-routing processing at an entry router cluster node, optionally transit via at least one intermediary router cluster node, and undergo exit processing at an exit router cluster node.

In accordance with a further aspect of the invention, the router-cluster-node-centric configuration employs a tag conveyed with each packet within the cluster router infrastructure. The tag holds specifiers tracking packet processing within the cluster router.

In accordance with a further aspect of the invention, packets being processed are tagged with a tag specifying that a packet is undergoing one of a routing processing and a special packet processing functionality.

In accordance with a further aspect of the invention, each tag holds a tag time-to-live specification decremented while the associate packet propagates via router cluster nodes in the cluster. The packet is discarded when the time-to-live specification is zero and the packet has not reached a corresponding exit router cluster node thereby reducing transport overheads.

In accordance with a further aspect of the invention, a router-cluster-node-centric configuration enabling the provision of a distributed packet routing response in a cluster router having a plurality of router cluster nodes and at least one special purpose cluster node is provided. The configuration includes at least one routing functional block determining a need for special functionality in respect of processing a packet. At least one router-cluster-node-centric packet processing flow effects forwarding of the packet to a special purpose cluster node for processing.

In accordance with a further aspect of the invention, the at least one router-cluster-node-centric packet processing flow further specifies one of: storing a copy of the packet header and a corresponding tag in an optional header of the packet; and storing information about the packet in a storage structure for the purposes of continuing packet processing in accordance with the router-cluster-node-centric configuration.

In accordance with yet another aspect of the invention, the at least one cluster-node-centric packet processing flow further specifies employing addressing information stored in the packet header in forwarding the packet requiring special processing towards a special purpose cluster node.

Advantages are derived from: a configurable, and scalable cluster router design providing a re-configurable high routing capacity using cost effective stock PC hardware; from the intra-connection network which provides a high degree of diversity ensuring resilience to equipment failure; from the use of a star topology with respect to management links which reduces management overheads in the intra-connection network; and from the ability to forward packets to designated special purpose router cluster nodes optimized to provide specific packet processing functionality.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

A solution is proposed wherein multiple routing elements are configured to operate as a single routing entity seeking cost reductions and improvements in scalability, and easy re-configurability. Improvements are sought in performing certain functions such as, but not limited to: billing, payload decryption/encryption, decoding/encoding content, network management, video stream processing, authentication, directory services, etc. While cost overheads may be reduced by employing inexpensive off-the-shelf equipment, provisioning special functionality may benefit from the use of specialized equipment when a favorable efficiency-cost ratio may be taken advantage of in respect of specific packet processing functionality.

Figure 1:
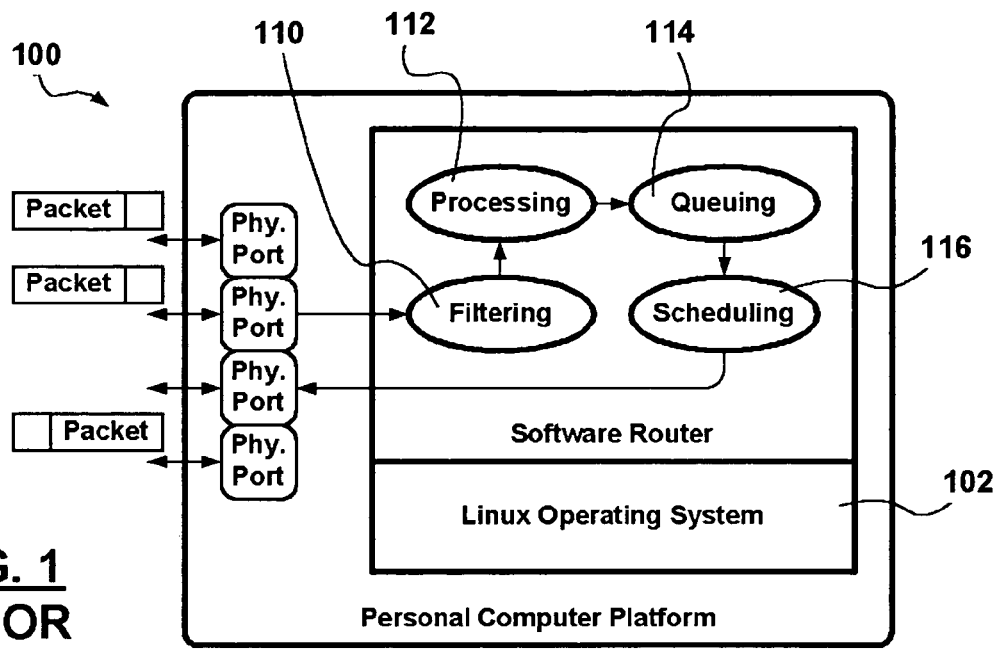
FIG. 1 is a schematic diagram showing elements implementing a prior art personal computer executing packet routing software code.
Figure 3:
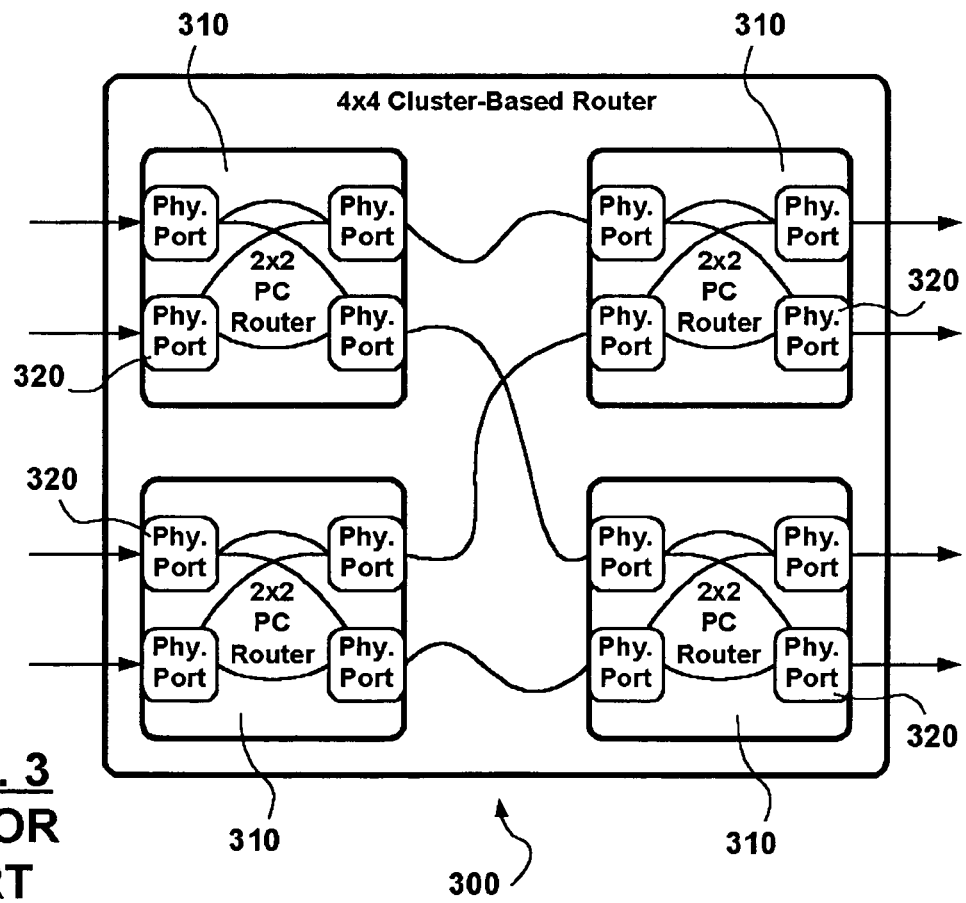
FIG. 3 is a schematic diagram showing a prior art non-blocking cluster-based router architecture.
Figure 2:
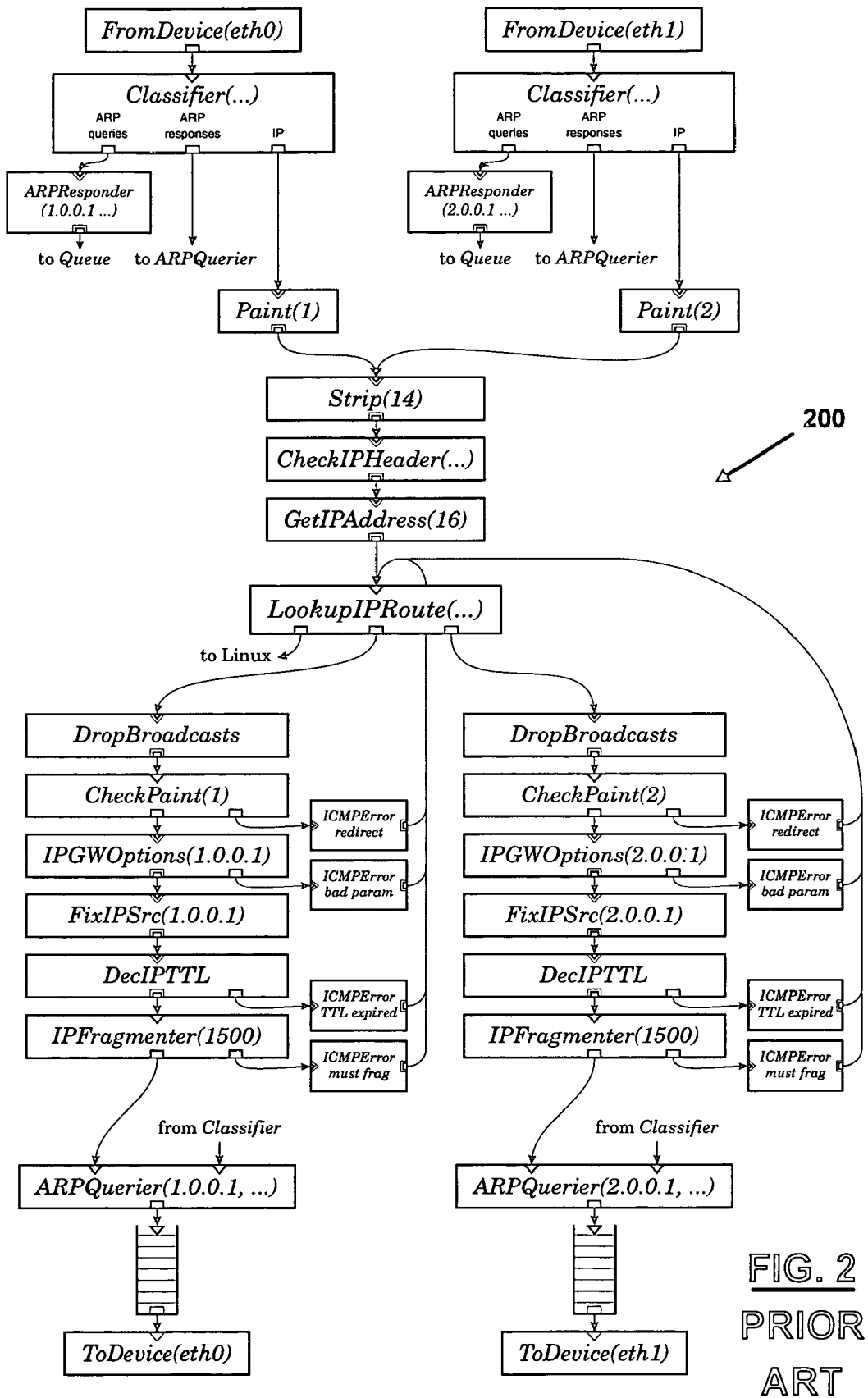
FIG. 2 is a schematic diagram showing packet processing flows directing packets between router functional blocks in accordance with a Click configuration implementing an exemplary IP router.
Figure 4A:
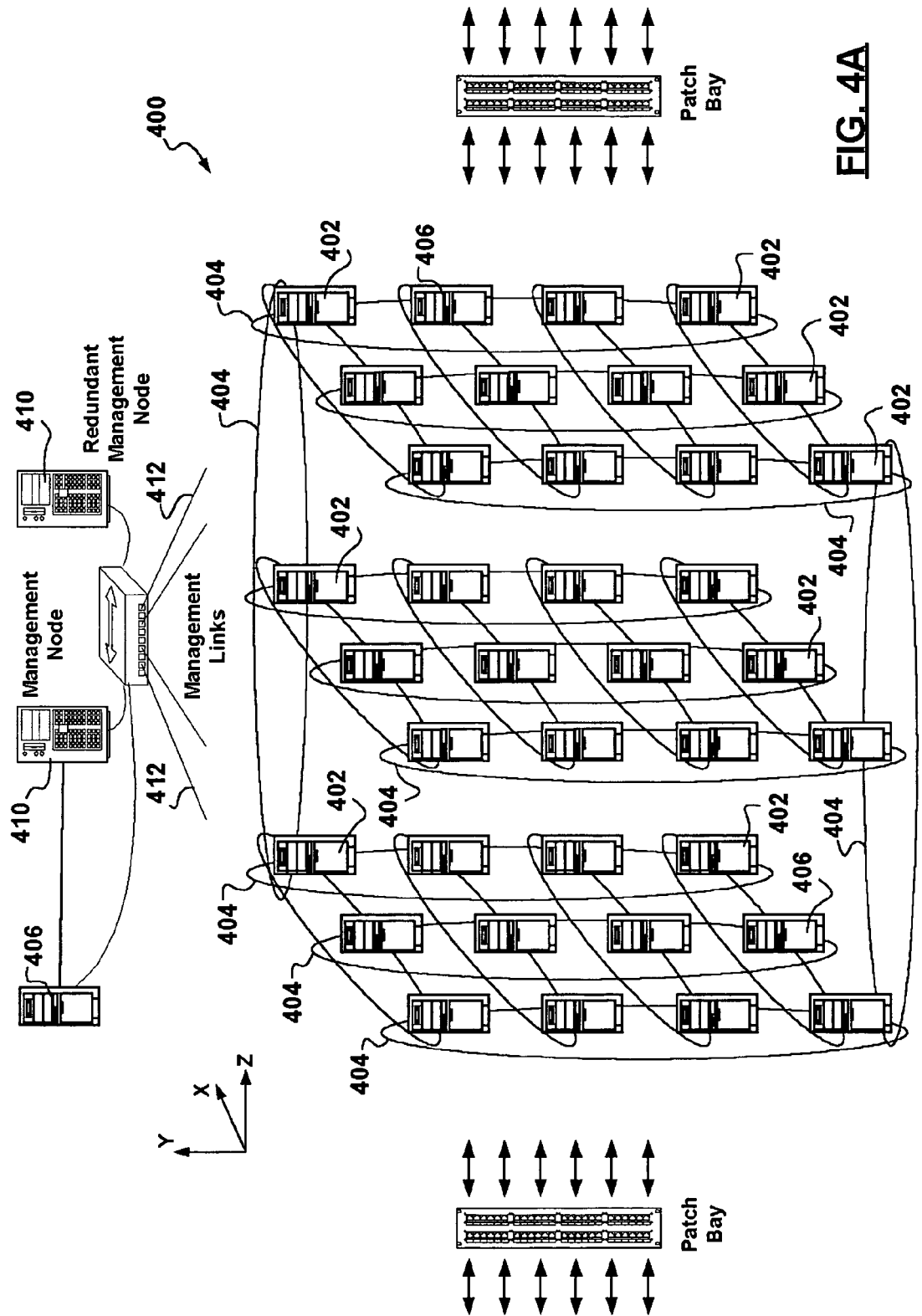
FIGS. 4A and B are schematic diagrams showing, in accordance with exemplary implementations of an exemplary embodiment of the invention, cluster-based router architectures having three dimensional and seven dimensional interconnectivity respectively.

In accordance with an exemplary embodiment of the invention, FIG. 4A shows an exemplary cluster-based router implementation 400 which includes a 3×4×3 (cluster) arrangement of PC-based router cluster nodes 402 interconnected in accordance with a toroidal topology. Selected cluster router nodes 406 represent special purpose router cluster nodes providing special packet processing responses. If special purpose router cluster nodes 406 include off-the-shelf equipment having superior capabilities in respect of special packet processing functionality; a reduction in the development, validation, and deployment costs of the proposed solution may be provided. Dedicated, single unit, hardware implemented packet processing equipment may employed such as, but not limited to: billing systems, statistics generators, directories, databases, etc. Such a hybrid cluster router 400 would therefore benefit from optimized hardware implemented packet processing functionality of the special purpose router cluster nodes 406 while the shortcomings (cost, flexibility, re-configuration, etc.) of such dedicated, single unit, hardware implemented equipment are mitigated by employing the PC-based router cluster nodes 402.

The invention is not limited to the number of router cluster nodes, nor to the topology shown. An arbitrary number of router cluster nodes 402 (typically a large number) and 406 (typically a small number) may be interconnected in accordance with various topologies without limiting the invention. The choice of the number of router cluster nodes 402/406 is chosen to obtain a required packet response processing (routing) capacity, while the chosen topology employed is a balance between advantages and disadvantages including, but not limited to: cost, complexity, delay, blocking probability, etc. which may be dependent on the routing capacity.

In accordance with the exemplary embodiment shown, the individual router cluster nodes 402(/406) are arranged in x, y, and z slices; and each router cluster node 402(/406) is physically connected 404 to adjacent router cluster nodes 402 in the x, y, and z directions. In is pointed out that only two z-toroidal inter-connections are shown in order to improve clarity of FIG. 4A, however every router cluster node 402 participates in a z-toroid of which (exemplary) there are twelve in total. The toroidal interconnections 404 shown in FIG. 4A, implement a dedicated cluster intra-connection network. In order to simplify the presentation of the relevant concepts, toroidal interconnections 404 will be referred to herein as internal interconnection links 404 connected to internal ports without limiting the invention thereto. Each internal interconnecting link 404 between any two router cluster nodes 402(/406) may either be a unidirectional or a bi-directional link without limiting the invention.

Wraparound internal interconnection links 404 complete toroidal interconnectivity ensuring that every router cluster node 402(/406) has, in accordance with the exemplary toroidal topology employed, six adjacent router cluster nodes 402 (/406) to ensure path diversity. Should any router cluster node 402(/406) or internal interconnecting link 404 fail, the toroidal topology ensures that other paths between any source and destination router cluster nodes 402(/406) exist.

In accordance with the exemplary embodiment of the invention, employing toroidal interconnectivity between the router cluster nodes 402 enables all router cluster nodes 402 to be equivalent. In particular the toroidal topology does not dictate which router cluster nodes 402 are edge or core router cluster nodes 402. Such designations may of course be made logically, if necessary, and may only apply to a specific service being provisioned. However, depending on each particular implementation, such designations may bring about a management overhead. The equivalency between router cluster nodes 402 enables each router cluster node 402 to have external physical links (schematically shown as patch bays) providing physical connectivity to communications network (s) in which the cluster router 400 participates. Therefore, in accordance with the exemplary embodiment of the invention, each router cluster node 402 may act as an entry, core, and/or exit router cluster node 402 with respect to the packet traffic processed by the cluster router 400.

The router cluster node equivalency, provided via the toroidal topology, provides a highly scalable packet routing capacity and port count increasing monotonically ~O(N) with the number N of router cluster nodes 402 in the cluster router 400 assuming that the number of special purpose router cluster nodes 406 in the cluster router 400 is relatively small. Additional capacity may be added typically by adding another x, y, or z slice (n−1 dimensional plane) of router cluster nodes 402 without requiring replacement or expansion of the existing infrastructure.

The cluster router 400 may be controlled by management software allowing an operator to configure the behavior of each router cluster node 402 and therefore of the entire cluster router 400 via a software-based specification language with appropriately coded routing functionality blocks (a modified version of the Click routing framework being an example) to affect packet routing in accordance with the exemplary embodiment of the invention.

In accordance with an exemplary implementation of the exemplary embodiment of the invention, at least one additional node 410, shown in FIG. 4A, may act as a cluster-remote management node responsible for: startup, initial configuration of each router cluster node 402 in the cluster router 400, lookup table synchronization, monitoring, performance reporting, etc.

Special purpose cluster router nodes 406 may also be managed via associated node management means, described elsewhere. Management nodes 410 may also act as management entities to special purpose cluster nodes 406 without limiting the invention thereto.

In accordance with the exemplary toroidal topology of the exemplary embodiment of the invention, should a number of the router cluster nodes 402 or a number of interconnecting links 404 fail, the cluster router 400 will continue to route (process) packets therethrough, perhaps, but not necessarily, at a reduced routing capacity until the failed infrastructure is brought back on-line which represents an improvement over dedicated single unit routing equipment. Whether packet (processing) routing capacity is affected by a particular infrastructure failure, is dependent on actual packet traffic patterns within the cluster router 400. However, as long as routing capacity and packet transport capacity is still available in the cluster router 400, the toroidal interconnectivity provides a possibility for work distribution over the remaining router cluster nodes 402.

Failure of special purpose router cluster nodes 406, may be mitigated by employing redundant special purpose router cluster nodes 406, default special purpose packet response processing, relegation of special packet processing functionality to management nodes 410, etc.

Figure 4B:
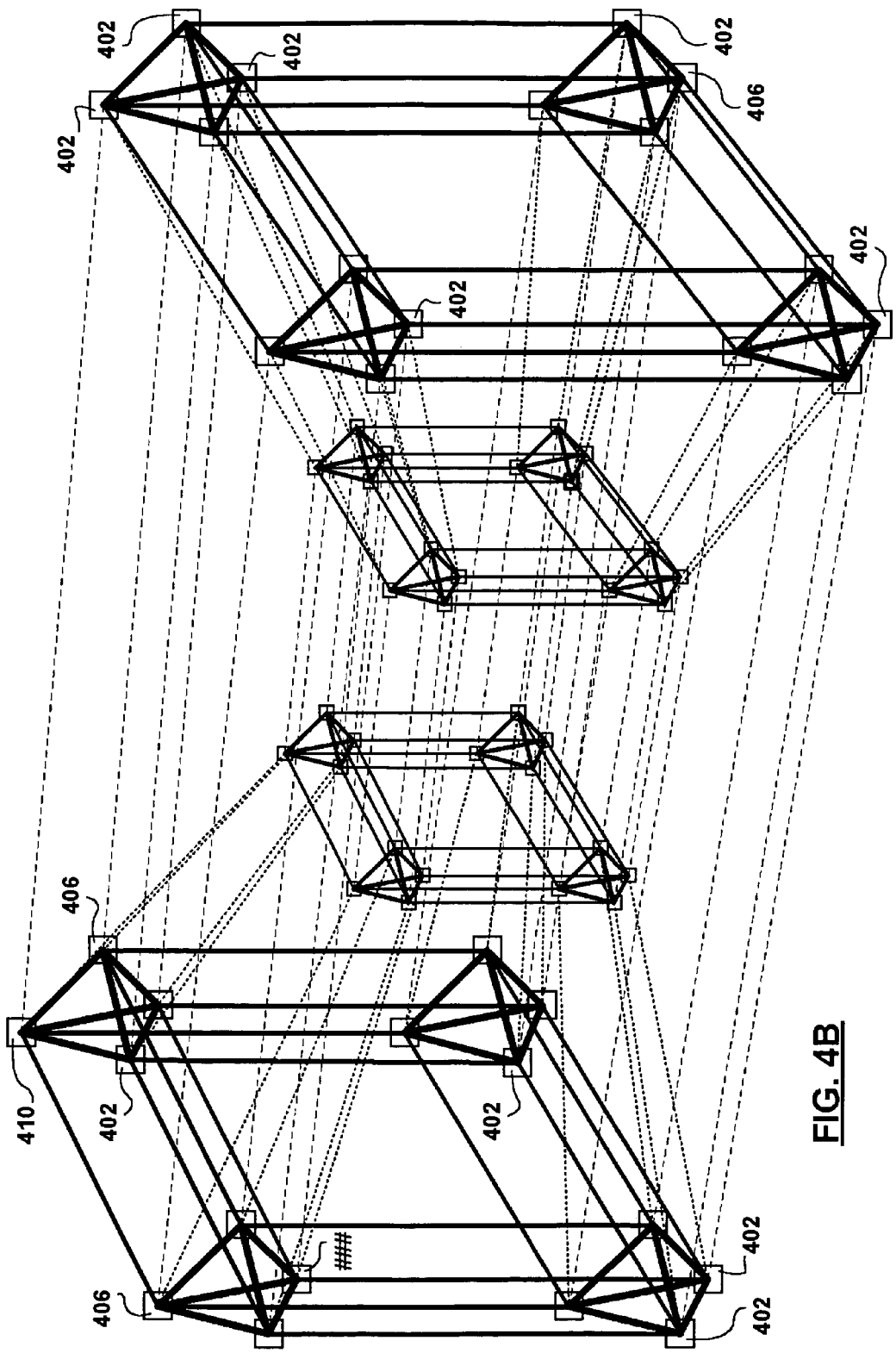

Due to the toroidal topology employed, the lattice of the cluster router 400 can be extended to multiple dimensions: rather than linking each router cluster node 402 only to neighbor router cluster nodes 402 in the x, y and z direction, each router cluster node 402 can be linked to 2*n neighbors in n dimensions. FIG. 4B shows exemplary 7-dimensional router cluster node 402/406 interconnectivity (external connectivity as shown in FIG. 4A). The additional interconnectivity provides: increased path diversity thereby reducing blocking probability, reductions in the number of hops between entry and exit router cluster node 402 pairs, reductions in transmission delay, and provides the possibility for packet processing distribution away from congested router cluster nodes 402 (congestion mitigation). Theses advantages come at a cost of increased wiring, maintenance, packet processing distribution decision making, etc. complexity; and an increased cost of: a large number of cables, a correspondingly large number of network interface cards, PC motherboards adapted to interconnect with numerous network interface cards, multiported network interface cards, etc. Thus the choice of a specific interconnection density is a design choice to be made based on specific application environment requirements.

In accordance with the exemplary implementation of the exemplary embodiment of the invention, cluster management software, if executing on cluster-remote management nodes 410, communicates with router cluster nodes 402(/406) via dedicated management links 412 ensuring that the cluster intra-connection network does not incur an in-band management overhead. If management functionality available via the management links 412 does not necessitate a high bandwidth, the cluster router 400 need not incur a high deployment cost overhead associated with the management links 412.

In FIG. 4A, the management links 412 are shown to form a star topology between the cluster-remote management nodes 410 and the router cluster nodes 402(/406). No such limitation is implied in respect of the invention, a variety of other topologies may be employed including bus topologies. The star topology ensure the availability of management functionality one-hop-away from each router cluster node 402(/406 if managed by management nodes 410).

While employing a bus topology provides native broadcast capabilities, particularly benefiting lookup table synchronization, without necessarily providing a change in the number of management links 412 when compared to the star topology; employing a bus topology exposes the cluster router 400 to a collision overhead in the management links 412. The collision overhead may be mitigated by employing higher bandwidth infrastructure for the bus topology management links 412, or by employing multiple busses, both propositions adding significant costs to such implementations. Depending on the size of the cluster router 400, the benefits of the native broadcast capabilities in employing a bus topology may overweigh the cost incurred by the collision overhead. The actual implementation of the management network is therefore left to design choice.

In accordance with an exemplary implementation, the management links 412 may be implemented as serial links. Serial links employ serial ports typically available directly on the motherboard of each PC router cluster node 402 reducing bus connector requirements imposed on the design of each PC motherboard. While the aggregation of all serial links at the management node may require aggregation equipment, such aggregation equipment exists and enjoys standardization.

Special purpose router cluster nodes 406 may include dedicated single unit hardware implemented equipment providing enhanced packet response processing with respect to special functionality such as, but not limited to: billing, encryption, decryption, stream encoding/decoding, video stream processing, authentication, directory services, etc. Depending on the architecture of the special purpose router cluster node 406 equipment, there may be a mismatch between the number of physical ports available and the degree of interconnectivity in the cluster intra-connection network. If the number of internal interconnection links 404 connectable to each router cluster node in the cluster router 400 is larger then the number ports available at a special purpose router cluster node 406, then the mismatch may be mitigated by employing multiplexer/demultiplexer equipment; the choice of the number of special purpose router cluster nodes 406 and multiplexer/demultiplexer equipment being dependent on the bandwidth necessary in provisioning the special functionality at the special purpose router cluster nodes 406.

In accordance with another implementation of the exemplary embodiment of the invention, shown in FIG. 4B, at least one router cluster node in (the lattice of) the cluster router 400 is designated as an in-cluster management node 410 providing management functionality either: on a dedicated basis 406 (the special functionality being cluster router management), in conjunction with providing routing functionality (402), or in conjunction with (other) special functionality (406). In case a failure is experienced by the router cluster node (402/406) designated as the primary management node 410, another router cluster node 402/406 may be designated as the "active" management node 410 on short order without requiring infrastructure modifications to the cluster router 400.

In accordance with another exemplary implementation, management functionality employs in-band signaling and messaging incurring a small management overhead while the management functionality being a number of hops away from a large number of cluster router nodes 402(/406 if managed by management nodes 410).

Depending on a particular implementation of the exemplary embodiment of the invention, special functionality nodes 406 may be associated with cluster-remote management nodes 410, as shown in FIG. 4A, or may be interconnected in the cluster router 400 as cluster router nodes 406 as mentioned above. In associating the special functionality nodes 406 with the cluster-remote management nodes 410, the management links 412 must have available adequate bandwidth. If a high bandwidth management link 412 were employed for each router cluster router node 402, special functionality would be provided "one-hop-away" from each router cluster node 402 determining a need for the special functionality in processing a packet.

However, if the special functionality router cluster nodes 406 are interconnected in the lattice of the cluster router 400, then the larger the cluster router 400, the further in terms of hops the special functionality nodes 406 would be, on average, from the router cluster node 402 determining a need for the special functionality in processing a packet. The distance in terms of the number of hops between the router cluster node 402 determining the need for special functionality and the special functionality router cluster nodes 406 providing the special functionality, being insignificant if the packet processing cost in terms of a total transport delay along the cluster intra-connection network is much much smaller than packet response processing at the nodes 402, 406, and 410.

In accordance with the exemplary embodiment of the invention, the same routing functional block definitions are provided to each router cluster node to ensure that each router cluster node is capable to perform every and any routing functionality necessary. Details regarding the necessary routing functionality blocks is provided herein below with reference to FIG. 5 and FIG. 6. In particular PC-based cluster router nodes 402 receive the routing functional block definitions and act accordingly.

However, in-cluster special functionality router cluster nodes 406 may be dedicated special purpose single unit hardware equipment, and therefore may not be capable of receiving, interpreting, and/or acting in accordance with the distributed routing functional blocks. Nor would in-cluster special purpose router cluster node 406 be capable of receiving, interpreting and/or acting in accordance with a distributed cluster router configuration. For all intents and purposes, in-cluster special purpose router cluster nodes 406 act as if connected in a communications network of no particular significance between other (router cluster) nodes (402); the degree to which this is achieved being balanced against cluster router configuration complexity:

In accordance with the exemplary embodiment of the invention, a cluster-node-centric router cluster node configuration, distributed in the router cluster 400, specifies cluster-node-centric packet processing flows within each router cluster node 402 such that each router cluster node 402 by itself, and/or the aggregate of all router cluster nodes 402/406 in the cluster router 400 provide packet routing functionality. Details of exemplary cluster-router-node-centric configurations are provided herein below with respect to FIG. 5 and FIG. 6. In ensuring interoperability with special purpose router cluster nodes 406, cluster-node-centric cluster router node configurations must take into account the fact that special purpose cluster router nodes 406 cannot be counted on to be aware of, or be configured via, the distributed cluster-node-centric router cluster node configuration.

In accordance with the exemplary embodiment of the invention, each router cluster node 402 is also provided with a list of special functionality provided via specific special purpose router cluster nodes 406. The list may include redundant entries. The list may also be updated on a regular and/or as needed basis. Each router cluster node 402 may further request an update from a management node 410.

Alternatively special purpose router cluster nodes 406 providing special functionality may be discovered perhaps by employing a services discovery protocol such as, but not limited to: Lightweight Directory Access Protocol (LDAP), extended Domain Name Services (DNS), and/or mechanisms employed in respect of the Extensible Open Routing Platform (XORP) described in respective Requests For Comments RFCs 2671, 2782, 2307 and incorporated herein by reference.

For easy understanding of the concepts presented herein and without limiting the invention thereto, router cluster node physical ports are designated as: internal ports, external ports, and loopback ports. Internal ports terminate cluster router internal interconnecting links 404 participating in the intra-connection network implementing the toroidal topology of the cluster router 400. External ports terminate cluster router external links to communication network nodes external to the cluster router 400 (see patch bays in FIG. 4A). The loopback ports enable each router cluster node 402 to provide all the necessary and related routing functionality need to process a received packet especially when the packet is to be sent towards the intended destination via an external link associated to the same router cluster node 402 which received the packet.

In order for the cluster router implementation presented herein to replace a single router, not only is it necessary for packets to be processed by the router cluster nodes 402/406 of the entire cluster router 400 as if they were processed by a single router, but the entire cluster router 400 must appear to external communications networks and nodes as a single communications network attached (router) entity. Adherence to the requirement is complicated by the fact that different external links are connected to different router cluster nodes 402 in the cluster router 400.

An addressing scheme, perhaps as simple as using Media Access Control (MAC) addressing may be relied on. Internet Protocol addressing may also be used, however reliance on such use, as packets hop from router cluster node 402/406 to router cluster node 402/406, may lead to a lot of unnecessary protocol stack processing. In using MAC addressing to refer to each router cluster node 402/406, each physical port has a globally unique MAC address ascribed thereto during manufacturing thereof, the MAC address of a particular router cluster node 402/406 may be set to the lowest MAC address value of all of the physical ports associated therewith (or to the lowest MAC address of a multiplexer/demultiplexer). It may be necessary that only physical ports used to implement the cluster intra-connection network be considered in an internal router cluster node addressing scheme to ensure that packets do not spill out of the cluster router 400 prematurely while propagating between cluster router nodes 402. In order for the aggregate of router cluster nodes 402 to appear as a single router to external communications networks, the MAC address of the cluster router 400 may be set to the lowest MAC address of all router cluster node (ingress and egress) external ports (external addressing scheme).

In accordance with an exemplary implementation of the exemplary embodiment of the invention, the MAC address of the cluster router 400 is determined by the router cluster nodes 402 in the cluster router 400 cooperatively. The invention is not limited to this particular method of determining the address of the cluster router 400. However, employing methods of dynamic internal cluster router MAC address determination, takes into account that the router cluster node 402 with the smallest MAC address may be removed and installed at another location in an associated communications network thus preventing packet misdirection.

In accordance with another exemplary implementation of the exemplary embodiment of the invention, the external MAC address of the cluster router 400 may be determined by a management node 410. If the management node is used solely for management of the cluster router 400, then the MAC address of the management node 410 may be used as the MAC address of the entire cluster router 400. If a group of redundant management nodes are used, then the group of management nodes may collectively employ a dynamic external MAC address determination scheme which takes into account that any one of the management nodes 410 may fail or may be relocated in an associated communications network.

In accordance with the exemplary embodiment of the invention, router cluster nodes 402 in the cluster router 400 may employ only a reduced protocol stack in implementing the cluster intra-connection network. If the cluster router 400 is exemplary employed for routing Internet Protocol (IP) packets, the router cluster nodes 402 may only implement Ethernet encapsulation in the cluster intra-connection network.

Having received a routing response, a packet in transit towards the exit router cluster node 402, if unchecked, may circle around the redundant intra-connection network (404) forever introducing an uncontrollable transport bandwidth overhead.

In accordance with the exemplary embodiment of the invention, each packet is tagged to identify the received packet as one having received a routing response or as one necessitating special functionality, and propagating through the cluster router 400 towards an intended router cluster node 402/406. A variety of tagging means may be employed including, but not limited to: using optional packet header, adding packet trailers, and/or encapsulating the received packet with additional (Ethernet) headers having cluster router relevance only. Upon arriving at a specified exit router cluster node 402, the tag is removed.

In accordance with the exemplary embodiment of the invention, a TagTTL value is specified in the tag for each tagged packet, the TagTTL having cluster router 400 relevance only. An initial MaxTagTTL value would be set to an empirically determined value typically dependent on the size of the cluster router 400. The MaxTagTTL value must be set high enough to enable the packet to traverse the entire cluster router 400, yet the MaxTagTTL value must be set low enough to minimize packet transport overheads.

In accordance with the exemplary embodiment of the invention, FIG. 5 A, B, and C show a flow diagram representative of a router-cluster-node-centric configuration disseminated to each router cluster node 402.

Figure 5A:
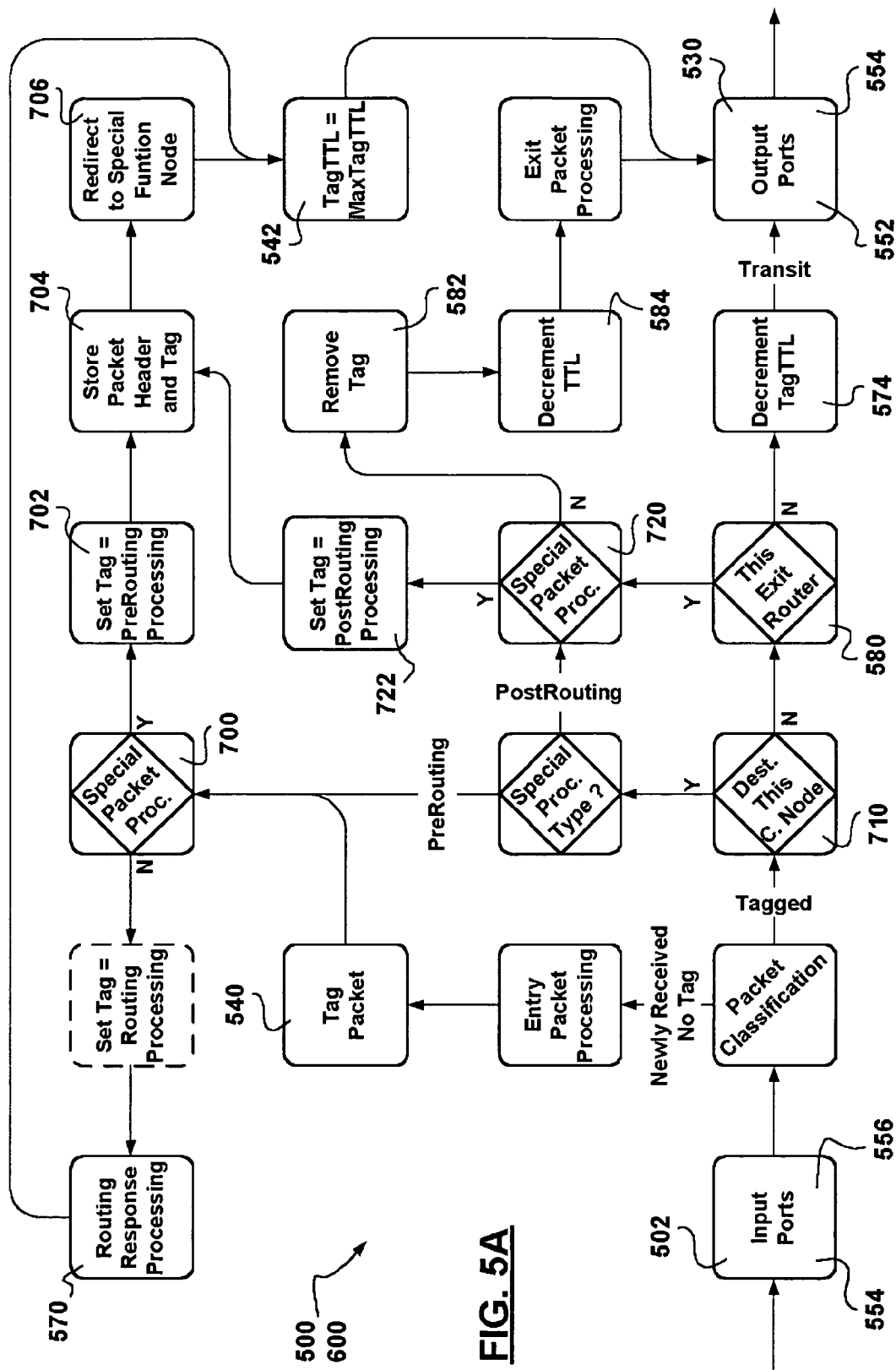
FIGS. 5A, B, and C are schematic flow diagrams showing exemplary packet processing flows and routing functional blocks providing packet routing in accordance with an exemplary embodiment of the invention.

FIG. 5A is a high level overview of the router-cluster-node-centric configuration 500 (and 600). In accordance with an exemplary implementation of the exemplary embodiment of the invention, the goal of determining a routing response for each received packet is divided into entry packet processing and routing response processing; special functionality processing; and exit packet processing.

Each packet received via an external input port 502 is classified to determine which leg of the configuration 500 to subject the packet to. Newly received packets (received via an external input port 502) are directed to an entry packet processing leg, whereby the packet undergoes entry packet processing and routing response processing. Subsequent to receiving the packet, the packet is tagged 540. A determination is made 700 as to whether pre-routing special packet processing is required, such as, but not limited to: decryption, decoding, billing, etc.

If pre-routing special packet processing is required, an indication that the packet is undergoing special pre-routing processing is specified 702 in the tag; the entire packet header and tag are stored, without limiting the invention thereto, in a secondary optional header 704; the tag source and destination specifications are cleared; and source and destination specifications in the packet header are populated 706 with the MAC address of the router cluster node 402 which determined that the packet required special processing, and the MAC address of the special purpose router cluster node 406 providing the special functionality respectively. The TagTTL value is set 542 to the MaxTagTTL value. The packet is subsequently transmitted over one of the internal output ports 552 (or 554 as appropriate).

Intermediary router cluster nodes 402, based on the fact that the tag specifies that the packet requires special processing, employ source and destination information specified in the packet header, not in the tag, to direct the packet towards the special function router cluster node 406 decrementing 574 the TagTTL in the process.

The special function router cluster node 406 receives the packet and because the special function router cluster node 406 is not (expected to be) knowledgeable the existence of the cluster router 400 in which it participates, the special function router cluster node 406 simply provides the special functionality such as, but not limited to: decryption, decoding, billing, etc. On performing its function, the special function router cluster node 406 ignores the tag as the tag is implemented as an optional header extension, and also ignores the secondary optional header. On completing its function, the special function router cluster node 406, reverses the source and destination addressing information in the packet header, not in the tag, and transmits the packet over an appropriate output port thereof.

Having received special processing while the tag remains still intact, intermediary router cluster nodes 402, based on the fact that the tag still specifies that the packet requires special processing, employ the reversed source and destination information specified in the packet header, not in the tag, in forwarding the packet towards the router cluster node 402 which determined the need for special functionality. The TagTTL value is decremented 574 as the packet is forwarded in the cluster router 400.

Ultimately, the router cluster node 402 which determined that the packet needed special processing, finds 710 itself as the destination, and makes a determination 700 whether the packet requires further pre-routing special processing. If further pre-routing special processing is required the process is repeated. Care must be taken to ensure that at least addressing information from the original packet header is saved at all times and that the packet header including the tag is reconciled with the saved version thereof. Depending on implementation, special processing may include modifying the regular packet header, since the original copy is kept, a regular packet header reconciliation must be performed as appropriate and specific to each implementation before routing response processing is performed.

Alternatively, the original packet header may be stored in a data structure along with appropriate packet identification at the router cluster node 402 sending the packet for special processing, however in accordance with such an implementation additional storage resources must be provided and managed at each router cluster node 402 increasing resource utilization overheads associated therewith. Packet identification may be included in the tag. Storing the regular packet header in the secondary optional packet header increases the size of each packet and therefore incurs a bandwidth overhead in the cluster intra-connection network.

Depending on the particular special processing required the bandwidth overhead may be reduced: Some forms of special packet processing such as billing may only require a copy of the actual packet header, without the payload, to be transmitted to the billing special purpose router cluster node 406 without returning anything from the billing special purpose router cluster node 406, thereby reducing resource utilization in the cluster intra-connection network.

If no further pre-routing special packet processing is required 700, the packet receives a routing response 570 and is forwarded via (a cluster router external port 530,) an internal port 552 or the loopback port 554 as appropriate after the TagTTL value has been reset 542 to the MaxTagTTL value.

Tagged packets propagate in the cluster router 400 lattice from router cluster node 402(/406) to router cluster node 402(/406) according to addressing information held in the tag towards the exit router cluster node 402 by following the transit leg of the configuration 500. The TagTTL value is decremented 574 along the way.

The exit packet processing leg of the configuration 500 is typically followed upon receiving a packet via an cluster router internal port 556 or loopback port 554. As part of exit processing, a determination 720 is made as to whether the routed packet necessitates post-routing special packet processing, such as, but not limited to: encryption, encoding, etc.

At the exit router cluster node 402 which determined that the packet requires post-routing special processing, an indication that the packet is undergoing special post-routing processing is specified 722 in the tag; and packet processing continues from step 704 as described above. The TagTTL value is set 542 to the MaxTagTTL value and the packet is subsequently transmitted over one of the internal output ports 552 (or 554 as appropriate).

With the post-routing special processing complete (or not necessary), the tag is removed 582 and the packet TTL is decremented 584 before packet transmission via an external link. The packet is then switched to be forwarded via the appropriate external port 530.

Figure 5B:
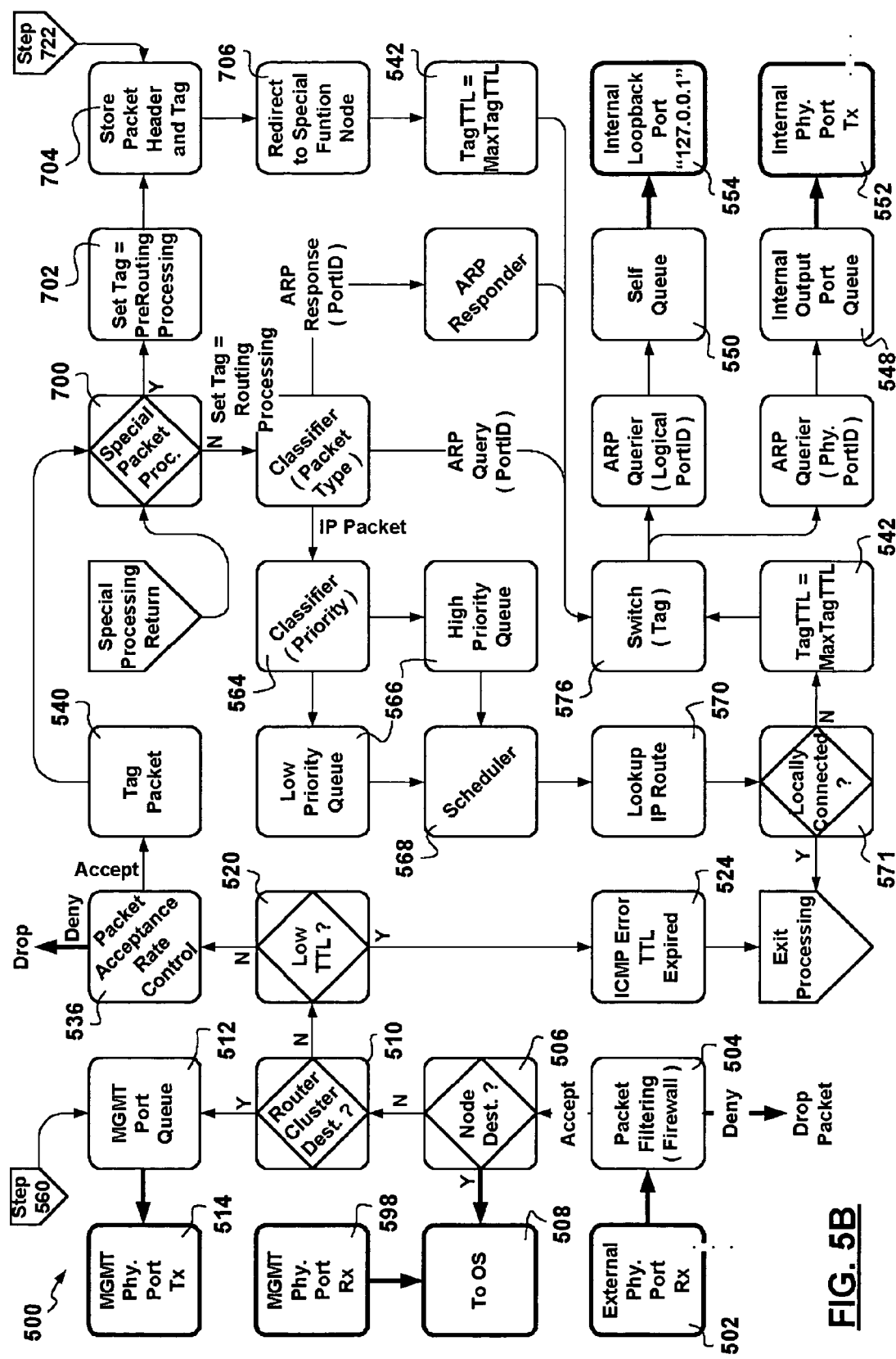

It was mentioned above that special packet processing may be provided by router cluster nodes 402 in conjunction with the provision of the routing response or packet forwarding specified in the router-cluster-node-centric specification. Details of an exemplary router-cluster-node-centric specification are provided following:

FIG. 5B shows details of the entry packet processing and routing response provisioning leg. A packet is received at the cluster router 400 via an external link and a corresponding external physical port 502. The received packet is typically provided to a packet filtering (firewall) block 504 exemplary subjecting the received packet to packet acceptance rules. If the packet is not accepted, the packet is dropped.

If the packet is accepted by the packet filtering block 504, the packet is forwarded to a decision block 506, which determines whether the packet is specifically destined for the subject router cluster node 402 currently processing the packet. If the packet is destined for the subject router cluster node 402, the packet is forwarded to the Operating System (OS), block 508—in this case the router cluster node operating system. If the packet is not destined for the router cluster node 402, it is forwarded on to decision block 510.

Decision block 510 determines whether the received packet is destined for the cluster router 400 proper. If the packet is destined for the cluster router 400, the packet is forwarded to a management port output queue block 512 and is eventually transmitted via a management output port 514 to a dedicated management node 410. If a router cluster node is designated as a management node 410, then the packet is forwarded via an appropriate cluster router internal port 552 towards the designated management node. If the packet is not destined for the cluster router 400, in step 510, the packet is forwarded to decision block 520.

Decision block 520 inspects the packet header to obtain the packet TTL value. If the packet TTL value is too low, the packet is not processed any further with respect to providing a routing response. An ICMP Error "TTL Expired" message is formulated for the packet by block 524. The source and destination network node addressing specifications of the received packet are extracted and reversed, and the packet conveying the ICMP message is provided to the exit packet processing leg. As will be described with reference to FIG. 5C, the packet is placed on an output port queue 528 (lowest priority) of the external output port 530 corresponding to the input port 502 via which the packet was received. If the decision block 520 does not find a low packet TTL value, the packet is forwarded on.

The packet is typically (but not necessarily) subjected to a packet acceptance rate control block 536. The packet is further processed through various other entry packet processing blocks, for example to check the integrity of the packet header, to remove a number of bytes, etc, which will be omitted from being shown for brevity of the description of the exemplary embodiment presented herein. A person skilled in the art would specify a sequence of entry packet processing blocks necessary to support the services provided. Each such block typically performs a combination of: accepting the packet, modifying the packet header, dropping the packet with or without associated processing such as sending a message back, etc.

Special packet processing is performed as described with respect to FIG. 5A and tagged 540. The tag includes a data structure conveyed with the packet in an optional packet header. The data structure holds specifiers employed by router cluster nodes 402 to track the packet while in transit within the cluster router 400.

The packet is classified by classifier block 564 in accordance with the packet's priority for preferential processing and stored in a priority queue 566. Packets are scheduled for routing response processing by scheduler block 568 which preferentially selects high priority packets to be routed thereby enforcing quality of service guarantees. A route lookup is performed by lookup block 570.

Routing response processing results in the packet header being updated with next hop information including a network address of a next communications network node towards which the packet is to be conveyed upon leaving the cluster router 400, as well the tag information is updated with router cluster node addressing information (a MAC address specification) of the corresponding exit router cluster node 402.

Having received a routing response, decision block 571 determines whether the determined next hop network address is connected locally with respect to the subject router cluster node 402. If the network node corresponding to the next hop network address is connected to a port of to the subject router cluster node 402, then the packet is provided to the exit packet processing leg.

If the network node corresponding to the determined next hop address is not know locally, a TagTTL specifier is populated with a MaxTagTTL value by block 542. It is worth re-emphasizing that the TagTTL value is independent of the packet TTL value specified in the packet header. The TagTTL value is decremented each time the packet propagates through a router cluster node 402, whereas the packet TTL value is decremented 584 only once as part of packet exit processing by the exit router cluster node 402.

The routed and tagged packet is provided to a switch block 576. The switch block 576, based on the tag information and perhaps header information, queues the routed packet in an internal output port queue 548 or the self queue 550. A packet conveying content will typically be queued in one of the internal output port queues 548 of the router cluster node 402, while packet encapsulated signaling and control messages may be queued in the self queue 550 to implement content transport control functionality.

Various other routing functions may be provided including, but not limited to, address resolution processing. As packets are exemplary transmitted employing the Internet Protocol (IP), an in-band Address Resolution Protocol (ARP) is employed to access address resolution services provided in a typical IP communication network. The processing of ARP packets is schematically shown in FIG. 5B. Without limiting the invention to the particular implementation shown, a classifier block classifies packets by type: IP packets are provided to classifier block 564, ARP responses are provided to an ARP responder block, ARP queries and packets processed by the ARP responder are switched by block 576 to respective output-port-associated ARP querier blocks. ARP functionality may also be implemented out-of-band via the management node 410.

Other routing (related) functionality such as, but not limited to: Reverse ARP (RARP), Border Gateway Protocol (BGP), etc. may be implemented in accordance with the exemplary embodiment by specifying a appropriate packet flows in the router-cluster-node-centric configuration.

Figure 5C:
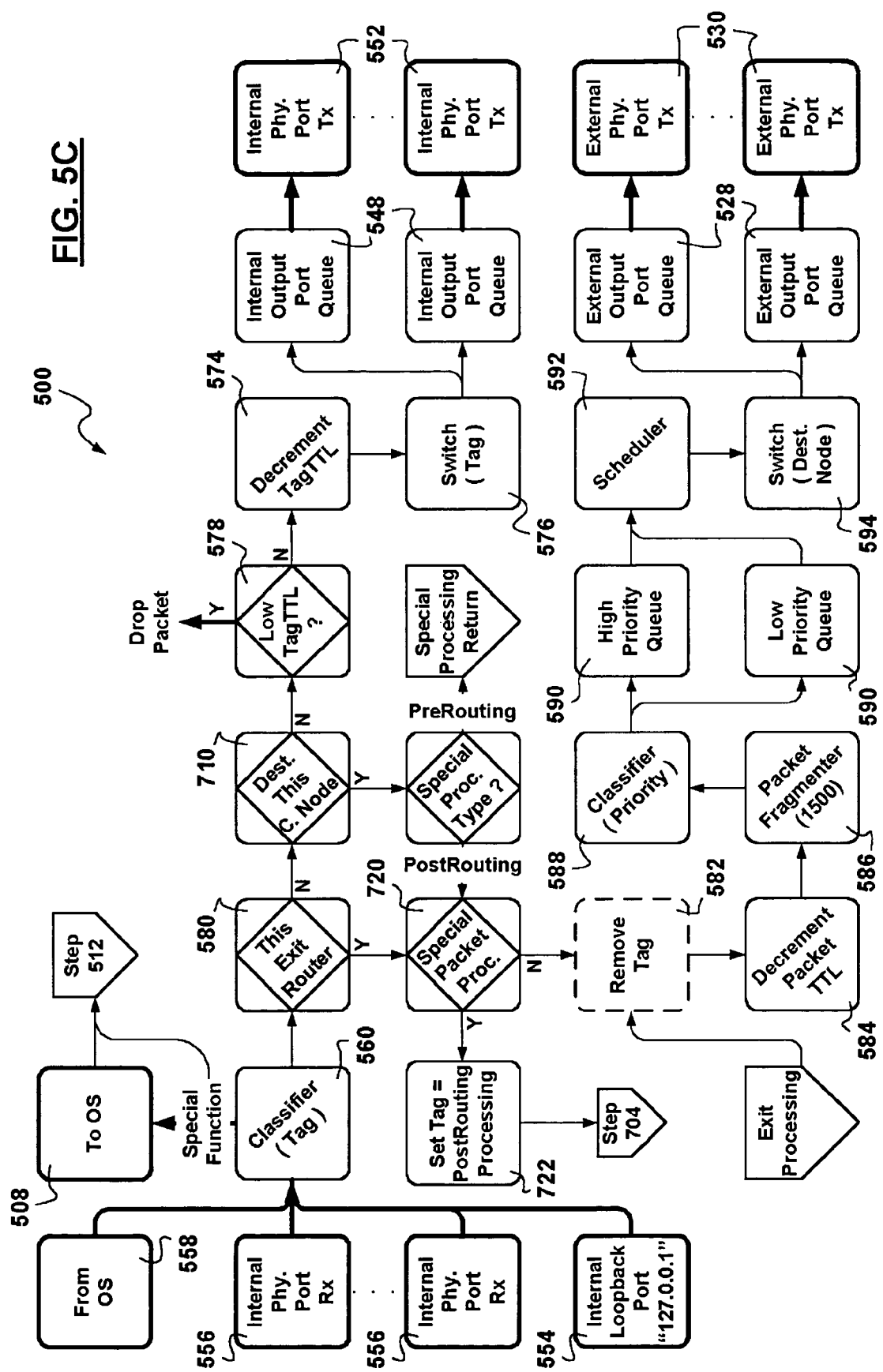

FIG. 5C shows router-cluster-node-centric configuration details related to processing packets received via an internal port 556, the logical loopback port 554, or from the operating system 558. Such packets may either require special functionality, transit, or exit processing.

A classifier 560 classifies received packets in accordance with information specified in the tag and perhaps also held in the packet header.

If the tag specifies that the received packet requires special processing, such as but not limited to: encryption/decryption, video stream processing (combine, decode, encode, format translation, etc.), authentication, directory services, etc., the classifier 560 determines from the tag information and destination information in the packet header and tag whether the special functionality is provided by the cluster router node 402(/406) itself or by a special purpose node 406 associated with an cluster-remote management node 410. The packet is provided to the OS, block 508, or to the management node 410 via block 512 as determined. The classifier 560 may determine that special processing may be provided by the subject router cluster node 402(/406) based on the type of special processing required as specified in the tag.

Decision block 580 determines whether the subject router cluster node 402 is the exit router cluster node specified in the tag of a received packet.

If the router cluster node 402 is not the exit router cluster node, the packet is in transit. Decision block 578 determines whether the TagTTL value is zero. If the TagTTL value is zero, the packet is discarded thus preventing packets from propagating in the cluster router lattice indefinitely. If the TagTTL value is not too low, the TagTTL value is decremented by block 574 and the packet is provided to the switch block 576 for forwarding.

If the subject router cluster node 402 is the exit router cluster node, as part of exit packet processing, the tag is removed by functional block 582, and the packet TTL is decremented by functional block 584. Not all received packets may be tagged such as low TTL packets. The configuration is exemplary of the flexibility provided.

A packet fragmenter block 586 fragments packets in accordance with transport characteristics of the external transport links beyond the router cluster node 402 and therefore beyond the cluster router 400.

A classifier block 588 classifies the packet in accordance with the packet's priority and the packet is stored in an appropriate priority queue 590.

A scheduler block 592, in accordance with a queue service discipline enforcing quality of service guarantees, provides packets from the priority queues 590 to a switch block 594 which takes into account the network address of the next hop communications network node held in the packet header of each packet provided, to determine the appropriate external output port 530 to forward the packet therethrough. The packet is queued for transmission in an external output port queue 528.

Making reference to FIG. 5B, the router cluster node may also receive a packet from the management port 598 which is forwarded to the OS 508. Packets received via the management port 598 include packets sent for special processing to a cluster-remote management node 410, or to a special purpose router cluster node 406 associated with the management node 410.

The OS takes the necessary steps to return 558 (FIG. 5C) all packets which have completed special processing to be further processed in accordance with the router-cluster-node-centric specification.

Figure 6:
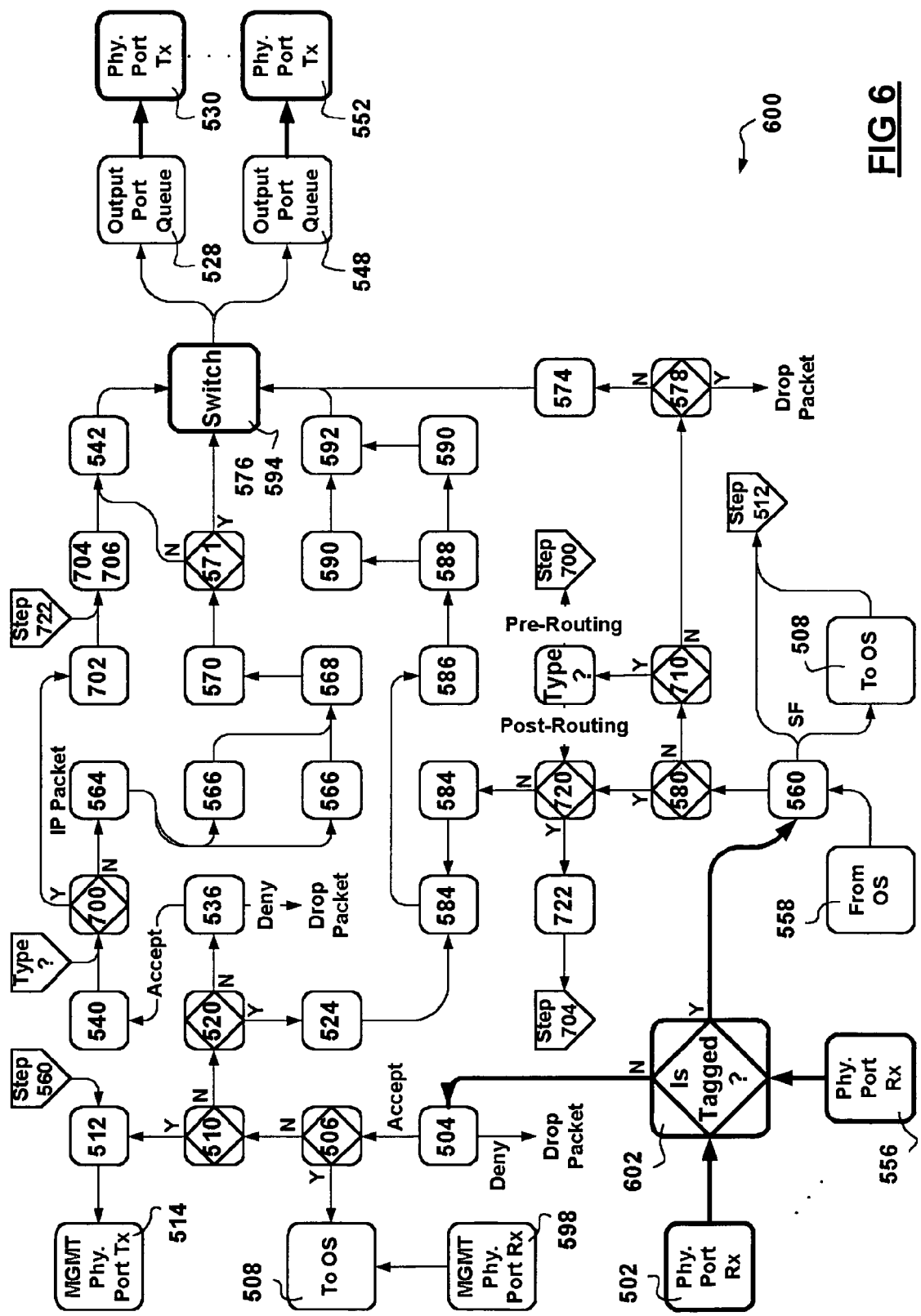
FIG. 6 is another schematic flow diagram showing exemplary packet processing flows and routing functional blocks providing packet routing in accordance with the exemplary embodiment of the invention.

As mentioned above, the separation between internal and external ports is not necessary. FIG. 6 shows schematically a router-cluster-node-centric configuration 600, corresponding to the router-cluster-node-centric configuration 500 presented in FIGS. 5B and C, with packet processing flow specifications rerouted based on all ports being equivalent. All packets are provided to a decision block 602 determining whether a received packet is tagged or not.

The router cluster nodes 402 need not have the same processing capacity nor be supplied by the same equipment vendor, although use of same vendor equipment would reduce maintenance overheads typically associated with stocking replacement parts.

However, in providing improved packet processing capabilities, specialized PC platforms may be used for performing specialized packet processing. For example, as mentioned above, a packet payload encryption/decryption packet processing response may be necessary. Encryption/decryption algorithms may make use of specialized CPU processing functionality to speed up packet payload encryption/decryption. A difference exists between employing Complex Instruction Set Computing (CISC) platforms as opposed to Reduced Instruction Set Computing (RISC) platforms. Both CISC and RISC router cluster nodes 402(/406) may however run the same operating system, Linux, and the exemplary router framework specially compiled for each specialized PC platform. Therefore the router-cluster-node-centric configuration in terms of routing functionality blocks may be distributed to the all router cluster nodes 402(/406) regardless of the hardware implementation thereof.

Therefore a low-cost, scalable cluster router design re-configurable in a simple cost conscious manner is provided. The routing functionality of the cluster router can easily be re-configured via modifying existing or employing additional special purpose routing functionality blocks to support varying customer needs, and different functional requirements. The routing functionality supported by and the configuration of the cluster router may also be made dependent on where the cluster router 400 is deployed in a communications network (edge/core/access).

A low-cost, scalable cluster router is useful as a communications network edge, where cost and scalability are very important. Such a cluster router could also be useful in small enterprise networks for the same reason. The cluster router design further provides a useful research tool due to its high degree of flexibility.

In accordance with the exemplary embodiment of the invention, an operator is provided with the ability to partition the computing power of a cluster router 400 into distinct virtual machines to provide engineered packet processing in respect of specific packet processing functionality via the router-cluster-node-centric configuration. Packet processing is further enhanced by employing special purpose router cluster nodes 406 having a better specific packet processing functionality to cost ratio.

The embodiments presented are exemplary only and persons skilled in the art would appreciate that variations to the above described embodiments may be made without departing from the spirit of the invention. The scope of the invention is solely defined by the appended claims.

I claim:
1. A cluster-based router comprising:
   a. a plurality of interconnected router cluster nodes, the routing capacity of the cluster router increasing substantially O(N) with the number N of router cluster nodes in the cluster router, each router cluster node having a group of cluster router external links enabling packet exchange with a plurality of external communication network nodes, wherein said plurality of interconnected router cluster nodes appears to external communications networks and nodes as a single communications network attached router;
   b. at least one special purpose cluster node providing special packet processing functionality that is not provided by any other of said router cluster nodes in the cluster router, wherein said at least one special purpose cluster is interconnected in a lattice of the cluster router but cannot be counted on to perform routing functions performed by said others of said router cluster nodes;
   c. a plurality of cluster router internal links interconnecting cluster nodes forming an intra-connection network ensuring a high path diversity in providing resiliency to failures; and
   d. a provisioned router-cluster-node-centric configuration distributed to each router cluster node for operating in accordance therewith in effecting distributed routing of the conveyed packets, wherein said provisioned router-cluster-node-centric configuration takes into account that said at least one special purpose router cluster node cannot be counted on to be aware of, or be configured via, said distributed cluster-node-centric router cluster node configuration.

2. The cluster router claimed in claim 1, wherein the router-cluster-node-centric configuration further comprises routing functional blocks and specifies packet processing flows between the routing functional blocks effecting packet processing employing one of: a single router cluster node, and a group of cluster nodes.

3. The cluster router claimed in claim 1, wherein each router cluster node further comprises a personal computer platform providing flexibility and cost savings in the development, deployment, maintenance, and expandability of the cluster router.

4. The cluster router claimed in claim 1, wherein at least one special purpose cluster node providing special packet processing functionality further comprises one of: a specially coded personal computer platform, a personal computer platform having designed hardware characteristics in providing specific functionality/dedicated hardware implemented equipment designed to provide an enhancement in providing special packet processing functionality/and a router cluster node further coded to provide special packet processing functionality.

5. The cluster router claimed in claim 1, wherein the intra-connection network further comprises an n dimensional toroidal topology, wherein 2*n internal links interconnect each router cluster node with 2*n adjacent neighboring router cluster nodes; the routing capacity of the cluster router being increased substantially linearly by adding an n−1 dimensional slice of router cluster nodes to the cluster router.

6. The cluster router claimed in claim 5, wherein the intra-connection network comprises a three dimensional toroidal topology, wherein six internal links interconnect each router cluster node with six adjacent neighboring router cluster nodes.

7. The cluster router claimed in claim 1, wherein the intra-connection network further comprises one of unidirectional and bi-directional internal interconnecting links.

8. The cluster router claimed in claim 1, further comprising: a router cluster node designated as a management node, should a management node designated router cluster node fail, another router cluster node being designated as a management node without making changes to the cluster router infrastructure.

9. The cluster router claimed in claim 1, further comprising: a router cluster node designated as a special purpose cluster node, should a special purpose cluster node designated router cluster node fail, another router cluster node being designated as a special purpose cluster node without making changes to the cluster router infrastructure.

10. The cluster router claimed in claim 1, further comprising:
    a. at least one management node; and
    b. a plurality of management links interconnecting the at least one management node with the plurality of router cluster nodes and enabling one of out-of-band: configuration deployment to each router cluster node, router cluster node initialization, and reporting functionality, employing the plurality of management links reducing an in-band cluster router management overhead.

11. The cluster router claimed in claim 10, wherein the plurality of management links from one of a star and a bus topology.

12. The cluster router claimed in claim 11, wherein the at least one special purpose cluster node is associated with the management node, special functionality being available one-hop-away from each router cluster node.

13. The cluster router claimed in claim 1, further comprising an cluster router internal addressing process dynamically determining router cluster node addressing.

14. The cluster router claimed in claim 1, further comprising a cluster router external addressing process dynamically determining a cluster router address.

15. The cluster router claimed in claim 1, further comprising means for distributing to each router cluster node information regarding availability and addressing information regarding special purpose cluster nodes.

16. The cluster router claimed in claim 15, further employing methods of detecting special purpose cluster nodes providing special packet processing functionality.

17. A router cluster node of a plurality of router cluster nodes interconnected in a cluster router, each router cluster node comprising:
    a. a plurality of cluster router internal interconnecting links connected thereto, the internal interconnecting links enabling the exchange of packets with adjacent cluster nodes in the cluster router;
    b. at least one cluster router external link connected to each of the cluster router nodes interconnected in the cluster router, the at least one external link enabling exchange of packets between communications network nodes external to said cluster router and the cluster router;
    c. a router-cluster-node-centric configuration to effect distributed routing of the conveyed packets, and
    wherein the inclusion of said at least one external link in each of the router cluster nodes in the cluster router provides a scalable router.

18. The router cluster node claimed in claim 17, wherein the router-cluster-node-centric configuration further comprises routing functional blocks and specifies packet processing flows between the routing functional blocks effecting packet routing employing one of: a single router cluster node, and a group of router cluster nodes.

19. The router cluster node claimed in claim 18, wherein the router-cluster-node-centric configuration further comprises routing functional blocks determining a need for special packet processing and specifies packet processing flows forwarding packets to at least one special purpose cluster node associated with the router cluster.

20. The router cluster node claimed in claim 17, wherein 2*n cluster router internal links interconnect the router cluster node with 2*n adjacent neighboring router cluster nodes in accordance with an n dimensional toroidal topology, the routing capacity of the cluster router being increased substantially linearly by adding an n−1 dimensional slice of router cluster nodes to the cluster router.

21. The router cluster node claimed in claim 17, further comprising: a management link interconnecting the router cluster node to a management node.

22. The router cluster node claimed in claim 17, further providing management functionality.

23. The router cluster node claimed in claim 17, further providing special packet processing functionality as a special purpose cluster node.

24. The router cluster node claimed in claim 23, wherein the special purpose cluster node provides packet processing in respect one of: authentication, decryption, encryption, decoding, encoding, billing, directory access, and video stream processing.

25. A router-cluster-node-centric configuration enabling the provision of a distributed packet routing response in a cluster router having a plurality of router cluster nodes, each including at least one external link enabling packet exchange with communication network nodes external to said cluster router, the configuration comprising:
   a. a plurality of routing functional blocks;
   b. at least one router-cluster-node-centric packet processing flow, via the plurality of routing functional blocks, to effect routing of packets received at the cluster router employing one of a single router cluster node and a group of router cluster nodes;
   c. an entry-and-routing processing packet processing flow specification;
   d. a transit packet processing flow specification; and
   e. an exit packet processing packet processing flow specification,
the packet processing flow specifications enabling a received packet to undergo entry and routing processing at an entry router cluster node, optionally transit via at least one intermediary router cluster node, and undergo exit processing at an exit router cluster node.

26. The router-cluster-node-centric configuration claimed in claim 25, wherein the router cluster node configuration further employs a tag conveyed with each packet within the cluster router infrastructure, the tag holding specifiers for tracking packet processing within the cluster router.

27. The router-cluster-node-centric configuration claimed in claim 26, wherein each tag identifies an associated packet as one having received a routing response and propagating through the cluster router towards a specified exit router cluster node.

28. The router-cluster-node-centric configuration claimed in claim 26, wherein each tag identifies an associated packet as one requiring special processing and propagating through the cluster router towards one of: a special purpose cluster node, and the router cluster node which determined that the packet required special processing.

29. The router-cluster-node-centric configuration claimed in claim 26, wherein each tag comprises a combination of: an optional packet header, a packet trailer, and an additional header encapsulating the associated packet having cluster router relevance only.

30. The router-cluster-node-centric configuration claimed in claim 26, wherein each tag holds a tag time-to-live specification decremented while the associated packet propagates via muter cluster nodes in the cluster, the packet being discarded when the time-to-live specification is zero and the packet has not reached a corresponding exit router cluster node thereby reducing transport overheads.

31. A router-cluster-node-centric configuration enabling the provision of a distributed packet routing response in a cluster router having a plurality of router cluster nodes and at least one special purpose cluster node as claimed in claim 25, the configuration further comprising:
   a. at least one routing functional block determining a need for special functionality in respect of processing a packet; and
   b. at least one water-cluster-node-centric packet processing flow effecting forwarding of the packet to a special purpose cluster node for processing.

32. The router-cluster-node-centric configuration claimed in claim 31, wherein the at Least one router-cluster-node-centric packet processing flow further specifies one of: storing a copy of the packet header and a corresponding tag in an optional header of the packet; and storing information about the packet in a storage structure for the purposes of continuing packet processing in accordance with the router-cluster-node-centric configuration.

33. The router-cluster-node-centric configuration claimed in claim 31, wherein the at least one cluster-node-centric packet processing flow further specifies at least one packet processing flow for further processing a packet having undergone packet processing at a special purpose cluster node.

34. The router-cluster-node-centric configuration claimed in claim 31, wherein the at least one cluster-node-centric packet processing flow further specifies employing addressing information stored in the packet header in forwarding the packet requiring special processing towards a special purpose cluster node.

* * * * *